United States Patent [19]
Burner et al.

[11] Patent Number: 5,788,148
[45] Date of Patent: Aug. 4, 1998

[54] VEHICLE HEATING APPLIANCE WITH OVERHEATING CHECKING DEVICE

[75] Inventors: Erwin Burner, Adelberg; Jürgen Epple, Waldenbuch; Michael Humburg, Göppingen-Jebenhausen; Johannes Koch, Adelberg, all of Germany

[73] Assignee: J. Eberspächer GmbH & Co., Esslingen, Germany

[21] Appl. No.: 669,355

[22] PCT Filed: Dec. 27, 1994

[86] PCT No.: PCT/EP94/04307

§ 371 Date: Jun. 28, 1996

§ 102(e) Date: Jun. 28, 1996

[87] PCT Pub. No.: WO95/18023

PCT Pub. Date: Jul. 6, 1995

[30] Foreign Application Priority Data

Dec. 31, 1993 [DE] Germany ............... 43 45 053.9

[51] Int. Cl.⁶ ................................................. G05D 23/00
[52] U.S. Cl. ............... 237/2 A; 237/12.3 C; 236/78 D; 236/21 B
[58] Field of Search ............... 237/12.3 C, 2 A; 318/610; 236/78 D, 21 B

*Primary Examiner*—Henry A. Bennett
*Assistant Examiner*—Derek S. Boles
*Attorney, Agent, or Firm*—McGlew & Tuttle

[57] ABSTRACT

In a vehicle heating appliance, an overhead state is detected by an overheating temperature sensor by means of a microprocessor. The overheating temperature sensor supplies a signal (UTF) to the microprocessor, and when the signal (UTF) exceeds a threshold value, the microprocessor blocks the transmission of driving signals to a driving transistor (Tr) for the fuel dosing pump. A circuit connected in parallel to the microprocessor with a threshold value switch acts as a redundant switching-off device. The output signal of the threshold value switch is applied to an AND-gate whose output is connected to the base of the driving transistor (Tr) and whose other input receives the driving signals from the microprocessor. When the signal UFT exceeds the threshold value of the threshold switch, the AND-gate blocks all signal transmission from the microprocessor to the driving transistor, so that the fuel dosing pump is stopped. The danger of overheating is detected in that the signal supplied by the overheating temperature sensor exceeds an overheating temperature threshold value. Preferably the microprocessor calculates a differential value from the signal supplied by the overheating temperature sensor and from an output signal supplied by a temperature sensor of the heat transfer medium. This differential value is compared with a threshold differential value in order to stop the fuel dosing pump if the calculated differential value exceeds the threshold differential value. Instead of stopping the fuel dosing pump, it may be enough to reduce the power of the burner in order to avoid the danger of possible overheating.

14 Claims, 3 Drawing Sheets

VEHICLE HEATING APPLIANCE WITH OVERHEATING CHECKING DEVICE

FIELD OF THE INVENTION

The present invention pertains to a vehicle heater, with a combustion air blower and a fuel feed device, which feed combustion air and fuel to a burner, which generates a flame in a flame tube. A heat exchanger is included, which is separated by a gas jacket from the space accommodating the flame tube, and through which a heat carrier, e.g., water, is pumped. A heat carrier temperature sensor, measures the temperature of the heat carrier. A control device, controls the operation of the vehicle heater as a function of at least the measured heat carrier temperature and which an overheating monitoring device, which responds to a imminent overheating at the heat exchanger in order to stop the operation of the device by blocking the fuel feed or by other countermeasures.

BACKGROUND OF THE INVENTION

Such vehicle heaters, which are frequently also called auxiliary heaters, are used in passenger cars, trucks, buses, motor coaches, small airplanes, recreational vehicles, construction equipment, or the like. Gasoline or diesel fuel, which is taken from the fuel reserve of the vehicle or from an auxiliary tank, is used as the fuel. Water is usually used as the heat carrier and it is pumped by a water pump through the heat exchanger and a heating circuit in order to supply thermal energy to one or more radiators (vehicle heat exchangers). Air may also be used as the heat carrier.

The heat carrier temperature sensor is used in these vehicle heaters as the transducer to determine the actual temperature of the heat carrier, which is compared with a desired temperature in the control device to control the operation of the vehicle heater. The control device, which is usually equipped with a microprocessor, adjusts the heat carrier temperature to a constant value by switching the burner on and off. This is done by switching on and off the fuel feed device, which is usually designed as a fuel feed pump, and the combustion air blower, and/or by controlling the fuel feed pump such that a certain burner output is reached.

For safety reasons, these vehicle heaters have an overheating monitoring device, which operates as a function of the temperature at the heat exchanger.

A vehicle heater, in which the control device contains a microprocessor, which also stores parameters and threshold values for the control, besides a control program, has been known from DE 30 31 410. The overheating monitoring device is designed to such that the microprocessor receives a signal from an overheating sensor to compares that signal with an overheating threshold value. Where the overheating sensor is arranged and how it is designed are not stated in the document.

It used to be common practice to design the overheating monitoring device as a switch or as a fuse. The fuse or the switch responds to an increased heat exchanger temperature in the area of the rear end of the flame tube in order to interrupt the circuit of the fuel feed pump, if necessary. The fact that the fuse must be replaced if necessary or the switch must be reset can be considered to be drawbacks of such monitoring devices. This is laborious. These drawbacks are avoided by the above-described measure, according to which a sensor is provided, to compare its output signal with a threshold value.

If a vehicle heater is installed in a motor vehicle, e.g., a passenger car, the device is integrated within the cooling/heating water circuit of the vehicle. A bypass line is led to the vehicle heater in order to guarantee the circulation of the heat carrier in the heat exchanger of the vehicle heater when the vehicle heat exchanger (radiator) is switched off, i.e., when no heat is absorbed. The water inlet temperature now nearly corresponds to the water outlet temperature at the vehicle heater. When the burner is in operation, this temperature increases relatively rapidly, so that the heater is switched off when a threshold value, established for the controlled operation, is exceeded shortly thereafter.

If the bypass line is to be abandoned for cost reasons, the heat carrier throughput in the heater drops practically to zero when no heat is removed from the heat carrier circuit, because, e.g., the vehicle heater has been switched off. The temperature in the heat carrier present in the heat exchanger of the vehicle heater increases rapidly in this situation, and the temperature also increases rapidly at the gas jacket surrounding the burner space in the area of the flame tube.

This extremely rapid increase in temperature at the gas jacket must be avoided by all means to avoid a dangerous overheating. It is therefore necessary to recognize the risk of such overheating in order to make it possible to take countermeasures.

SUMMARY AND OBJECTS OF THE INVENTION

The basic object of the present invention is to propose a vehicle heater of the above-described class, in which overheating is ruled out with certainty, especially at low heat carrier throughput in the heat exchanger.

To accomplish this object, the present invention provides for different alternative possibilities, wherein an "early recognition" of a state of overheating, which can be expected to occur at a high probability, is ensured, on the one hand, and, on the other hand, the safety of an early switching off of the heater is achieved in the case of a risk of overheating by means of a redundant system. According to a special aspect of the present invention, a temperature sensor is provided, which is particularly well suited for use in a vehicle heater of the type in question.

According to a first aspect of the present invention, the overheating monitoring device is equipped with an overheating temperature sensor, from which a signal is derived, and when a threshold value is exceeded, this signal means the development of a state of overheating, to prevent which the overheating temperature sensor is arranged in the vicinity of the end of the flame tube in contact with the gas jacket of the heat exchanger of the vehicle heater, wherein the control device gene rates a gradient signal from the output signal of the overheating temperature signal, and this gradient signal is compared with the threshold value, or the control device forms a difference value from the output signal of the overheating temperature sensor and the output signal of the heat carrier temperature sensor to compare this difference value with a difference threshold value. These two measures, i.e., either the use of a gradient threshold value, or the use of a difference threshold value, may also be combined, in which case the case of an overheating is assumed if one of the two threshold values is exceeded.

If, as was described above, the previously common bypass line is abandoned in a vehicle heater, i.e., if there is a risk that the heat carrier throughput tends toward zero with the vehicle heat exchanger switched off, the overheating temperature sensor arranged according to the present invention sends a signal to the control device, and the control device is able to form a gradient signal (time derivation of the temperature according to the time) from this signal. If the value of this temperature gradient exceeds a gradient threshold value, this signals that the temperature at the heat exchanger increases so rapidly that overheating can be expected to develop in a short time. If the gradient threshold value is exceeded, the heater is, e.g., switched off by blocking the fuel supply. Consequently, the overheating temperature sensor responds according to the present invention to the rate at which the temperature at the heat exchanger changes, rather than responding only to the fact that an absolute threshold value is reached. This corresponds to the early recognition of a tendency in the temperature change. Consequently, overheating is reliably prevented from occurring in the case of stagnation of the heat carrier in the heater.

This early recognition is especially advantageous if the heat carrier temperature sensor is arranged, as is also known in the state of the art, in the vicinity of the heat carrier inlet, i.e., on the water inlet side relative to the heat exchanger of the vehicle heater in the case of a heater using water as the heat carrier. Due to the heat carrier temperature sensor responsible for the control being arranged at the heat exchanger on the water inlet side, comfortable control of the desired temperature provided by the vehicle heater is possible. The temperature on the water inlet side in the heat exchanger is markedly more representative of the conditions prevailing at the vehicle-side heat exchanger (radiator) than is the temperature at the water outlet end of the vehicle heater heat exchanger. The control is consequently more stable.

Due to the design of the overheating monitoring device according to the present invention in the above-described form, there is, moreover, a possibility for the control device to monitor the function of the heating temperature sensor, on the one hand, and the function of the overheating temperature sensor, on the other hand, by the temperature value provided according to the present invention by the heat carrier temperature sensor being compared with the temperature value sent by the overheating temperature sensor to initiate, e.g., an emergency switch-off when it is determined that a predetermined difference is exceeded. This checking of the two temperature sensors for proper function is preferably performed during normal operation, i.e., with circulating heat carrier. The difference between the temperature value sent by the overheating temperature sensor and the temperature value sent by the heat carrier temperature sensor is constant within relatively narrow limits in this case, and the value sent by the overheating temperature sensor is somewhat higher than the other value. If an extremely great deviation is obtained between these two values (e.g., the value sent by the overheating temperature sensor is much higher or much lower than the value sent by the heat carrier temperature sensor), this means that one of the two temperature sensors is defective, or that a case of overheating is present or is very imminent, e.g., because of lack of water or hindered water throughput. An emergency switch-off will then take place for safety reasons.

The evaluation of the value sent by the overheating temperature sensor is performed in the control device. A second aspect of the present invention can be considered to be the fact that additionally or redundantly to the evaluation of the overheating temperature sensor output signal in the control device, direct switching off of the burner is performed by the signal arriving from the overheating temperature sensor. The present invention provides for this purpose that the control device contains a microprocessor, to which the measured signal from the heat carrier temperature sensor and the overheating temperature sensor are sent for evaluation, and that a circuit containing a threshold value switch is connected in parallel to the microprocessor, and the output signal of the threshold value switch blocks the fuel supply or is used to initiate other countermeasures.

A substantially increased reliability is achieved due to the above measure compared with the mere evaluation of the signal arriving from the overheating temperature sensor by the control device. Higher safety is achieved due to the fact that the threshold value switch is connected in parallel to the microprocessor performing the evaluation of the signal from the overheating temperature sensor, because the heater is switched off either based on the evaluation of the signals by the microprocessor or by the threshold value switch.

In particular, the microprocessor is able to recognize a state of overheating from whether the two temperature values are changing in the same direction, from whether there is a minimum temperature distance between the two sensors, and from whether the heat carrier temperature sensor sends a higher temperature value than the overheating temperature sensor.

As was explained above, the measured signals sent by the heat carrier temperature sensor and those sent by the overheating temperature sensor can be evaluated to form a gradient signal. This evaluation is performed in the microprocessor. Instead of forming a gradient signal now and comparing it with a gradient threshold value, the microprocessor can form a difference value from the two measured signals in a particularly preferred embodiment, to compare this difference value with a difference threshold value. This is based on the discovery that the temperature measured by the heat carrier temperature sensor does not excessively deviate during normal operation from the temperature that is measured at the overheating temperature sensor. The comparison of the difference between the measured values sent by the two temperature sensors with a difference threshold value is particularly effective, especially if the heat carrier temperature sensor is arranged at the water outlet pipe branch, which will be explained in greater detail below. If the two signals differ from one another by more than the difference threshold value, this means, with a certain probability, that an overheating is present or is very imminent.

As was mentioned above, the function of the temperature sensors can also be checked by a comparison of the measured values sent by the two temperature sensors, but the recognition of a state of overheating based on the fact that a difference threshold value is being exceeded is more important.

In a special circuit variant, the present invention provides for a driving circuit for the fuel feed device, with driving pulses being sent to the said driving circuit for the timed operation of the fuel feed device, and for the output of the threshold value switch being connected to one input of a logic element, to the other input of which the driving pulses are sent. As soon as the threshold value switch responds to a temperature signal from the overheating temperature sensor, which signal exceeds a certain value, the logic element is blocked, so that no driving pulses are sent to the fuel feed device.

The temperature sensors are preferably designed as PTC elements or NTC elements, i.e., elements having a positive or negative temperature coefficient, respectively. These elements increase or decrease their electric resistance with increasing temperature.

The arrangement of the heat carrier temperature sensor on the water inlet side of the heat exchanger makes possible a comfortable and stable control, as was explained in greater detail above. The overheating monitoring device is designed in the above-described manner for the early recognition of a possible overheating. According to a third aspect of the present invention, such a comfortable overheating monitoring device in connection with an overheating temperature sensor can be abandoned. Even though the embodiment according to this third aspect of the present invention may also contain the embodiment of the overheating monitoring device of the above-described type, the risk of a possible overheating with the heat carrier not circulating (a condition that can occur especially in the absence of a bypass line, as was explained above) is ruled out in a not quite so favorable, but less expensive embodiment by the heat carrier temperature sensor being arranged on the heat carrier outlet side of the heat exchanger, specifically on the water outlet side, and by the control device evaluating the temperature value measured by the heat carrier temperature sensor into a gradient signal, which is compared with a gradient threshold value to switch off the heater in the case of an excessively rapid increase in temperature.

While the temperature gradient of the signal sent by the overheating temperature sensor is determined according to the first aspect of the present invention explained above, the gradient of the temperature value sent by the heat carrier temperature sensor is formed and is used to recognize a possible heating according to the third aspect of the present invention. This variant of the present invention can also be embodied with a prior-art overheating switch or the like, but this has the drawback that the heat carrier temperature is controlled to the desired threshold value on the basis of an actual temperature signal, which is taken from the outlet side of the heat exchanger rather than from the inlet side. The temperature of the water is subject to greater variations at this water outlet side point of the heat exchanger than at the water inlet side end. The control is therefore less stable and less comfortable. This drawback is the price to pay for the less expensive embodiment of the overheating monitoring device, which is definitely present for safety reasons.

As is apparent from the above explanation, a heat carrier temperature sensor and an overheating temperature sensor are definitely present if the previously common overheating switch or the overheating fuse is to be abandoned. It was common practice before to arrange the two temperature sensors at different points of the vehicle heater. The heat carrier temperature sensor needed for the control was arranged on the water inlet side or on the water outlet side of the heat exchanger, while the overheating temperature sensor was arranged at a point remote from it, usually at the end of the flame tube. Two mounting openings had to be provided in the outer water jacket of the heat exchanger for the arrangement of these temperature sensors.

According to a special, fourth aspect of the present invention, a temperature sensor arrangement is created for simplification, which has a simple design and, in particular, can be mounted in a simpler manner on the vehicle heater.

The present invention provides here for a combination of the heat carrier temperature sensor and the overheating temperature sensor into a one-part combination sensor element.

This combination sensor element possesses the following features:

A support section, which is accommodated in an opening of the outer housing of the heat exchanger, A heat carrier temperature sensor joining one end of the support section, and an overheating temperature sensor joining at the same end of the support section next to the heat carrier temperature sensor.

The mounting of this combination sensor element is essentially as simple as the mounting of previously common temperature sensors, but a single mounting step is needed to arrange both sensors on the heater in the case of the combination sensor element. The two sensors are inherently in close proximity to each other. Since the overheating temperature sensor is to sense the temperature in the area of the gas jacket, but the heat carrier temperature sensor is to detect the temperature of the heat carrier, provisions are made according to the present invention for the length of the heat carrier temperature sensor, measured from the support section, to be shorter than that of the overheating temperature sensor. The sensor element screwed or otherwise fastened to the housing from the outside thus holds the heat carrier temperature sensor at a certain distance from the gas jacket, while the overheating temperature sensor is in direct contact with the gas jacket, or is located at least in the very close proximity of the gas jacket, so that overheating in the end area of the flame tube can be rapidly detected by the overheating temperature sensor, while the heat carrier temperature sensor is affected by this overheating only slightly at best. The latter is thus able to send an actual heat carrier temperature signal, which makes possible a stable control of the temperature of the vehicle heater. The two sensors may be accommodated either in a common housing or in separate housings.

Switching off the burner is the effective countermeasure in most cases in the case an imminent overheating. However, as an alternative and in addition, it is also possible to take other countermeasures in the case of an imminent overheating. The burner output can be reduced to subsequently check whether the increase in temperature at the overheating temperature sensor can be stopped or even canceled based on the reduced burner output. It is also possible to generate an alarm indication, so that operating trouble can be acoustically or optically signaled to the driver, e.g., in the case of vehicle heating. The driver can then decide whether to switch off the vehicle heater manually and/or to look for the cause of the trouble. However, since the countermeasures represent a safety measure, the alarm indication is generated, as a rule, in addition to the reduction in the burner output or to the emergency switch-off of the burner. If, e.g., the circulation of the heat carrier is hindered by a partial clogging or kinking of a line, the temperature at the heat exchanger increases relatively rapidly. Yet, it may be possible to continue to use the vehicle heater, albeit at a reduced output. Complete switching off of the burner would now be an exaggerated measure, whereas a reduction in the burner output offers the advantage that at least an emergency heating of the passenger compartment can still take place.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENTS

Figure 1:
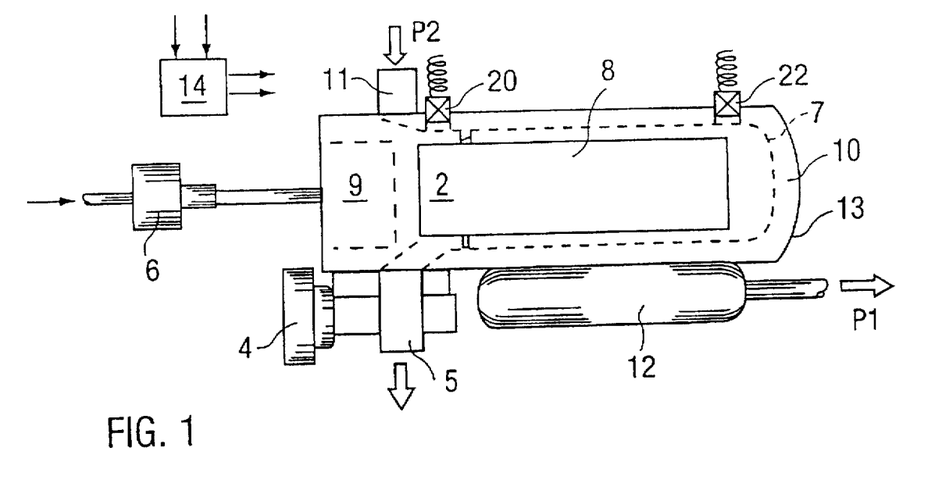
FIG. 1 is a schematic view of a vehicle heater.

FIG. 1 shows a vehicle heater, whose principal features are known.

A flame is generated in a combustion chamber 2 joining a burner head 9, for which purpose combustion air is fed to the burner 9 from a combustion air blower 4 and fuel is fed in via a fuel feed pump 6. The fuel is evaporated in the burner head 9, which is designed as a vaporizing burner here. The flame spreads to the right in FIG. 1 in the area of a flame tube 8. The flame tube is surrounded by a heat exchanger 10, which is a double-walled metal housing with an inner gas jacket 7 and an outer water jacket 13.

Water as a heat carrier enters the heat exchanger 10 via an inlet 11 in the direction of arrow P2, to leaves the heat exchanger 10 via a water pump 12 in the direction of arrow P1. Between the gas jacket 7 and the water jacket 13, the heat exchanger 10 has spiral turns, in which the water flowing through the heat exchanger 10 is heated by the hot gases, which are generated on the right-hand side of the flame tube 8 and reach the inner front surface of the gas jacket 7, to be discharged from there via an exhaust 5 between the outside of the flame tube 8 and the gas jacket 7.

The functions of the individual elements of the vehicle heater are controlled and regulated by a control device 14 having a microprocessor. A water temperature sensor 20, whose output signal is sent to the control device 14, is located as a heat carrier temperature sensor in the vicinity of the inlet 11. An overheating temperature sensor 22, whose output signal is also sent to the control device 14, is located at the right-hand end of the heat exchanger 10. In this case, the overheating temperature sensor 22 is in contact with the gas jacket 7, so that a good and rapid heat transmission takes place from the inside of the gas jacket 7 to the overheating temperature sensor 22.

In one embodiment of the present invention, the water temperature sensor 20 is located at a certain distance from the gas jacket 7, but it may also be in contact with the gas jacket 7 in another embodiment.

The overheating temperature sensor 22 has a design essentially similar to that of the water temperature sensor 20 used for control. Both are PTC elements here.

Figure 2:
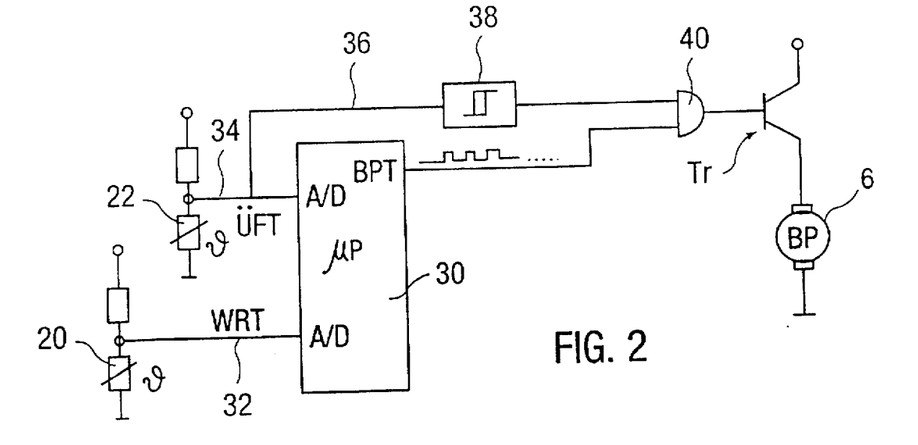
FIG. 2 is a circuit diagram of the control of the heater with overheating monitoring device.

The control device 14 has a microprocessor for evaluating various signals, of which the signals from the two temperature sensors 20 and 22 are of interest here. In addition, a circuit, which is independent from the microprocessor control and still guarantees the blocking of the fuel supply to the burner in the case of a failure of the microprocessor or in the case of a program error, is also provided in the control device 14. As is shown in FIG. 2, the two temperature sensors 20 and 22 send a "WRT" or UFT signal to a microprocessor 30. The WRT signal on line 32 is a voltage value that corresponds to the water temperature. The UFT signal on line 34 is a voltage value that corresponds to the temperature at the heat exchanger.

The signals on lines 32 and 34 are subjected to an analog-digital conversion and are evaluated by the microprocessor 30 according to defined criteria. If, e.g., the temperature at the water temperature sensor 20 drops, i.e., the voltage of the WRT signal decreases, and the temperature at the overheating temperature sensor 22 increases, i.e., while the signal voltage of the UFT signal increases, there is a threat of development of a state of overheating. Via a PBT (fuel pump driver) output, the microprocessor 30 sends driving pulses via a logic gate 40, preferably an AND gate 38, to a transistor driver Tr of the fuel feed pump 6, so that the latter is operated as a function of the driving pulses at the BPT output of the microprocessor 30. In the case of a possible overheating, the output signal at the BPT output is blocked. The duty factor of the pulses at the BPT output, i.e., the opening time of the driving transistor Tr related to a certain pulse duration, is set by the microprocessor 30, among other things, as a function of the temperature sent by the water temperature sensor 20 in the form of the WRT signal. The control is programmed such that an intermittent signal for opening the driving transistor Tr is sent to the BPT output until the microprocessor 30 switches off the driving transistor Tr upon reaching an upper control threshold value of the WRT signal. The microprocessor switches this transistor on when the WRT signal, decisive for the water temperature drops, below a lower control threshold value.

It could now happen that a software error prevents the above-described blocking of the output signal at the BPT output of the microprocessor 30 both in the normal control, i.e., when the fuel supply is blocked when the upper control threshold value is reached, and in the case of an imminent overheating. This may be due to a disturbance in the microprocessor 30, but also to a program error. However, it is still guaranteed in this case that the fuel feed pump 6 will be stopped before a harmful overheating of the vehicle heater.

A branch line 36 departs from the line 34. This branch line 36 leads to a threshold value switch 38, whose output is connected to an input of the AND gate 40. The other input of the AND gate 40 is connected to the output signal sent from the BPT output of the microprocessor 30. When the voltage on line 34 increases above a certain value corresponding to a relatively high temperature at the overheating temperature sensor 22, the threshold value switch 38 responds to this and generates at its output a low-level signal, as a result of which the AND gate 40 is closed, so that the output signals cannot reach the driving transistor Tr from the BPT output of the microprocessor 30. The fuel feed pump 6 is stopped as a result.

As is apparent from FIG. 2, the overheating monitoring circuit is designed as a redundant circuit. One way of stopping the fuel feed pump leads via the microprocessor, which compares and evaluates the two signals in the lines 32 and 34. The other way leads in parallel to the microprocessor 30 via the threshold value switch 38.

Figure 3:
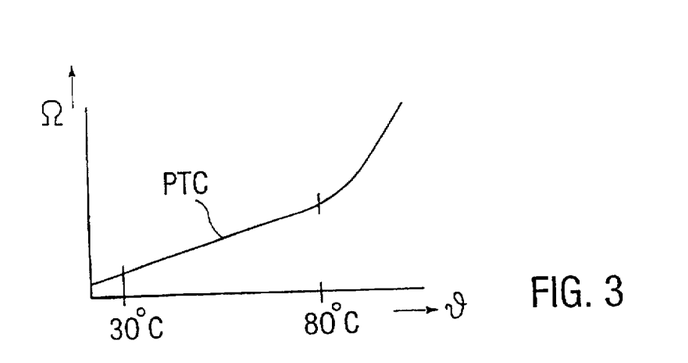
FIG. 3 is a graphic representation of the change in the resistance of a PTC element as a function of the temperature.

FIG. 3 shows the behavior of each of the two temperature sensors 20 and 22, both of which are designed as PTC (positive temperature coefficient) elements. There is a linear relationship between the temperature detected and the resistance of the PTC element in a range between 30° C. and 80° C. The threshold value switch 38 is set to a suitable value.

After the state of overheating has been determined, the fuel supply to the burner is stopped by stopping the fuel feed pump 6. When the state of overheating is no longer present, the operation of the burner can be continued without any special manipulation being necessary. A warning signal, which signals to the user of the heater that overheating has taken place at the heat exchanger, is preferably generated in the case of an overheating. The user now has the possibility of checking the heater and optionally eliminating any disturbances as may be present.

Another embodiment of the present invention will be explained below. An imminent state of overheating is also recognized in this embodiment on the basis of the UFT signal sent by the overheating temperature sensor 22 by a suitable evaluation by the microprocessor 30.

However, it shall first be explained how and why, e.g., an overheating may occur at the heat carrier.

Figure 4:
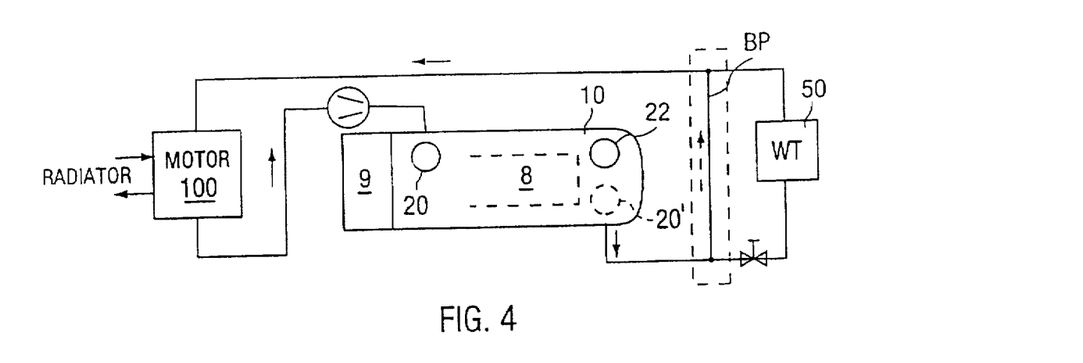
FIG. 4 is a schematic representation of a heat carrier circuit with vehicle heater, vehicle heat exchanger and internal combustion engine.

The heater shown in FIG. 1 with the burner head 9, the flame tube 8, and the heat exchanger 10 is schematically shown in FIG. 4. The water temperature sensor 20 in the area of the inlet of the heat exchanger 10 and the overheating temperature sensor 22 in the end area of the flame tube 8 are schematically indicated as well.

The vehicle heater is usually integrated within the cooling circuit of the engine of the motor vehicle. As can be seen in FIG. 4, the engine 100, which is connected to the radiator of the vehicle in the usual manner, is in connection with the inlet of the heat exchanger 10. The outlet of the heat exchanger 10 is in connection with the inlet of a heat exchanger (WT) 50 of the vehicle. The outlet of the heat exchanger 50 is again connected to the engine 100. The heat exchanger 50 is the "radiator" or "radiators" with which, e.g., the interior space of the vehicle is heated. The heat supply to the heat exchanger 50 can be blocked or throttled by means of slides or valves. The heat carrier (here: water) is circulated by means of a water pump 12.

In addition, FIG. 4 shows a bypass line BP, whose purpose is to make possible the circulation of the water through the heat exchanger 10 with the heat exchanger 50 blocked. As is known, the vehicle heater is controlled such that if a certain desired temperature is set, the burner is switched on and off depending on the water temperature detected. If the water temperature determined by the water temperature sensor 20 is below an upper threshold value representative of the temperature value set, the burner is in operation. The control switches off the burner when this threshold value is exceeded. This analogously applies to a lower threshold value as well. If the heat exchanger 50 is now blocked because no heat output is needed, the burner will initially continue to operate, because and while the water temperature determined by the water temperature sensor 20 is still below the upper threshold value. The water pump 12 pumps the water via the bypass line BP through the heat exchanger 10, so that the temperature of the water slowly increases, until the upper threshold value is finally reached and the heater is switched off.

It would be desired for various reasons to dispense with the bypass line BP, which requires additional costs in terms of material and labor. If the vehicle heat exchanger 50 is blocked without a bypass line BP, the water in the heat exchanger 10 is practically stagnant. When the burner is in operation, the temperature of the gas jacket and consequently of the water in the end area of the flame tube 8 increases very rapidly, while the temperature hardly changes at first at the other end of the flame tube 8, i.e., in the area of the water temperature sensor 20. This brings about the risk of overheating, so that corresponding countermeasures must be taken.

A special embodiment of the present invention now provides for the evaluation of the UFT signal sent by the overheating temperature sensor 22 by the microprocessor 30 (FIG. 2) into a gradient or derivative signal, i.e., for the microprocessor 30 forming the quotient or ratio of the temperature and time at regular, short time intervals.

Figure 5:
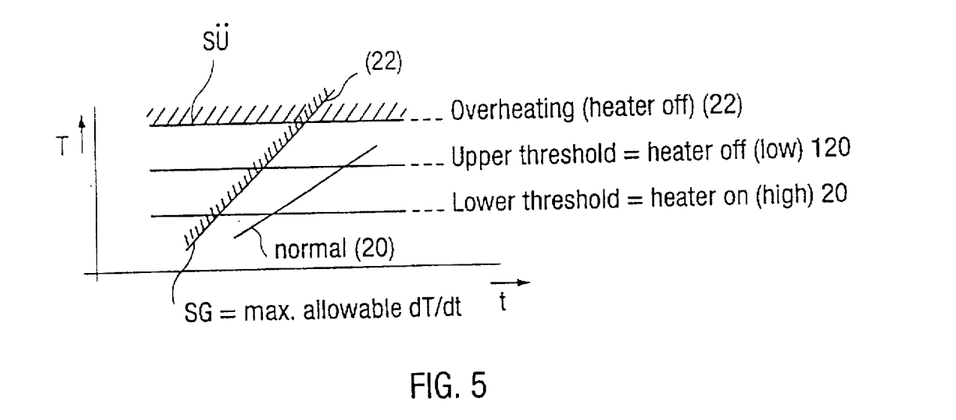
FIG. 5 is a graphic representation of various threshold values for the temperature control of the vehicle heater and for the overheating monitoring.

FIG. 5 shows a graphic representation of the water temperature T over the time t. An upper threshold and a lower threshold are shown for the heater, wherein the heater is switched off when the water temperature detected by the water temperature sensor 20 exceeds the upper threshold, while the heater is switched on when the water temperature drops below the lower threshold. Instead of the switching off and on, provisions may also be made for switching the burner from a high to a low output and vice versa.

An overheating threshold is also shown above the upper threshold. When the UFT signal sent by the overheating temperature sensor 22 exceeds this threshold value, the driving transistor Tr is blocked, as is shown in FIG. 2.

In this embodiment, the microprocessor 30 forms from the UFT signal a gradient signal, i.e., a signal that characterizes the increase in the temperature of the gas jacket 7 at the end of the flame tube 8. If we now assume that the vehicle heat exchanger (WT) 50 is blocked in FIG. 4, while the burner is still in operation, there is no water circulation through the water heat exchanger 50, and correspondingly there is practically no movement of water within the heat exchanger 10 of the vehicle heater. The temperature at the end of the flame tube 8, i.e., the temperature detected by the overheating temperature sensor 22, therefore increases more greatly than if, e.g., the vehicle heat exchanger 50 were only throttled somewhat. The latter case is called "normal" in FIG. 5. However, the gradient signal dT/dt is steeper in the case of the complete blocking of the vehicle heat exchanger 50 than the signal called "normal." When this steepness exceeds a gradient threshold value SG (=maximum allowable value of dT/dt), this is interpreted as an imminent state of overheating, so that the microprocessor 30 blocks the supply of fuel in the above-described manner. In the normal case, i.e., without overheating with the vehicle heat exchanger 50 opened, the control is performed on the basis of the signal sent by the water temperature sensor 20 in the manner described above in connection with FIGS. 1 and 2.

Instead of the formation of a gradient signal from the output signal sent by the overheating temperature sensor, a difference value is formed from the measured values sent by the overheating temperature sensor 22 and by the heat carrier temperature sensor 20 in an especially preferred embodiment of the present invention, and this difference value is compared by the microprocessor 30 with a preset difference threshold value. The measured values sent by the two temperature sensors 20 and 22 may differ from one another by a certain amount only during proper operation of the heater. If the deviation is greater, this very probably means a state of overheating or an imminent state of overheating.

The output signals of the two temperature sensors 20 and 22 can also be used for another function: There is a certain relation between the measured signals sent by the two temperature sensors during normal operation; e.g., the measured signal sent by the overheating temperature sensor 22 is always somewhat higher than the signal sent by the water temperature sensor 20. If the two values differ from each other by more than a certain difference, this may mean that one of the two temperature sensors does not function properly. Provisions are made that at least an alarm indication is generated in this case, and an emergency switch-off is also performed for safety's sake, so that the defective temperature sensor must first be replaced before the operation of the vehicle heater can resume.

Another embodiment of the present invention will be explained below on the basis of FIGS. 4 and 5. This embodiment makes it possible to achieve advantages in terms of cost compared with the embodiment described last, but its control comfort is not quite as favorable.

As is indicated in the bottom right part of FIG. 4 on a vehicle heater, a water temperature sensor 20', which replaces the water inlet side temperature sensor, may be located at the water outlet of the heat exchanger 10. The water temperature sensor 20' at the water outlet end of the heat exchanger 10 is in contact with the gas jacket 7, similarly to the overheating temperature sensor 22. The latter may also be designed as a temperature sensor as was explained above, but it may also be simply a fuse, as was previously common, to achieve protection against a possible overheating. Due to the water temperature sensor 20' being located at the water outlet end of the heat exchanger 10, it sends a signal which very strongly depends on the temperature ratios at the end area of the flame tube 8. If the movement of water in the heat exchanger 10 stops or nearly stops, the water temperature sensor 20', which is in contact with the gas jacket 7, will very rapidly detect an increase in temperature. The microprocessor 30 can evaluate this WRT signal from the water temperature sensor 20' which indicates an increase in temperature, in a similar manner as the UFT signal in the embodiment last described, i.e., the microprocessor 30 forms a gradient signal dT/dt from the WRT signal sent by the water temperature sensor 20' at defined time intervals, and when this gradient signal exceeds a gradient threshold value, the microprocessor switches off the driving transistor Tr of the fuel feed pump.

The fact that the vehicle heater is controlled on the basis of the heat carrier temperature detected at the water outlet side end of the heat exchanger 10 is a certain drawback of this embodiment. This temperature value is subject to short-term variations due to the operation of the burner, and these variations lead to a less stable control operation, so that the temperatures at the vehicle heat exchanger 50 are not controlled quite as uniformly as in the above-described embodiment.

As was mentioned above, a difference value is formed alternatively or additionally from the signals sent by the two temperature sensors 20, 22, besides the gradient value, in the embodiment in which the heat carrier temperature sensor 20 is arranged on the water inlet side, and this difference value is compared with a difference threshold value to recognize an (imminent) state of overheating. This difference value formation is especially well suited for the above-mentioned variant of the heater, in which the heat carrier temperature sensor 20' is arranged on the water outlet side. The measured signals sent by the temperature sensors 20' and 22 to the microprocessor 30 are processed by the microprocessor into a difference value. This may happen at defined time intervals. The difference value actually formed is compared with a difference threshold value stored in the memory of the microprocessor 30. When the threshold value is exceeded, the supply of fuel is switched off, or other countermeasures are taken.

The water temperature sensor 20 and the overheating temperature sensor 22 are separated from each other in space in all the above-described variants, the water temperature sensor 20 being arranged on the water inlet side of the heat exchanger 10, with or without contact with the gas jacket 7, while the overheating temperature sensor 22 is always in contact with the gas jacket 7 at the end of the flame tube 8.

Figure 6:
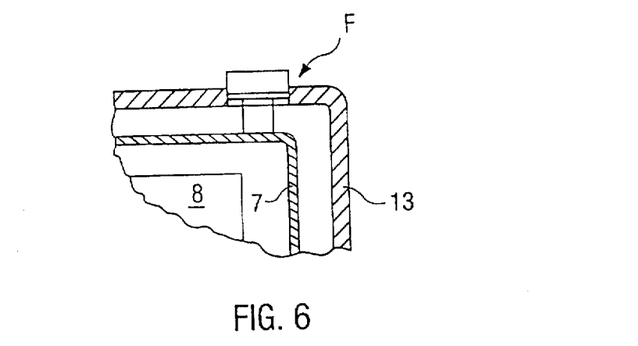
FIG. 6 is a simplified representation of part of a heat exchanger of the vehicle heater with a point at which a combination sensor element is arranged.

According to a special aspect of the present invention, the two temperature sensors may be integrated in a single component F, as is shown in FIG. 6.

FIG. 6 schematically shows the (inner) gas jacket 7 and the (outer) water jacket 13 of the heat exchanger, wherein a combination sensor element F, which is in contact with a sensing surface with the outside of the gas jacket 7, approximately in the area of the right-hand end of the flame tube 8, is arranged in an opening of the water jacket 13.

Figure 7:
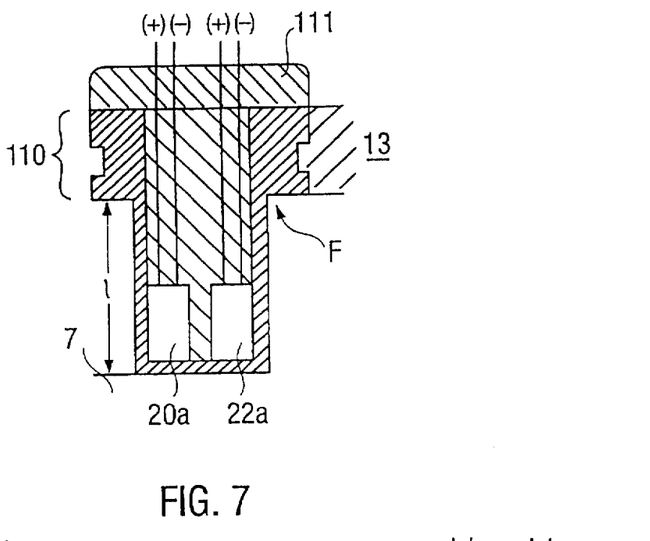
FIG. 7 is a variant of a temperature sensor arrangement in the form of the sensor element shown in FIG. 6 in a simplified form.

FIG. 7 shows a first, special embodiment of the combination sensor element F according to the present invention. With a support section 110, the sensor element F is located in the outer water jacket 13, and a head 111 of the sensor element F somewhat projects from the outer surface of the water jacket 13. Two pairs of conductors (+) and (−) extend through the sensor element F and lead to a water temperature sensor 20a and to an overheating temperature sensor 22a, respectively. The undersides of both temperature sensors 20a, 22a are in contact with the outside of the gas jacket 7, and the width of the space between the jackets 7 and 13, through which water flows, is designated by 1. Both temperature sensors 20a and 22a are in contact with the gas jacket 7 in this combination sensor element F.

Figure 8A:
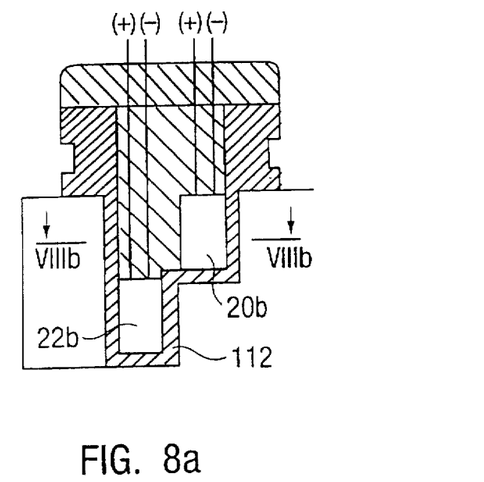
FIGS. 8a and 8b are a longitudinal sectional view and a cross-sectional view, respectively, of another variant of the sensor element shown schematically in FIG. 6.
Figure 8B:
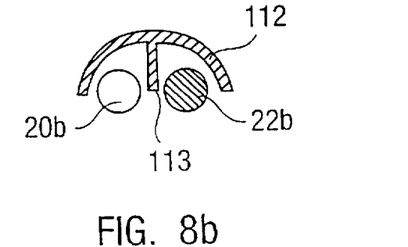

FIGS. 8a and 8b show a longitudinal sectional view and a cross-sectional view of another embodiment of a combination sensor element, respectively. The combination sensor element according to FIGS. 8a, 8b differs from the sensor element according to FIG. 7 in that the overheating temperature sensor 22 is S located at a different level than the water temperature sensor 20b. The front surface of the overheating temperature sensor 22b can thus be in contact with the outside of the gas jacket 7, while the water temperature sensor 20b has no contact with the gas jacket. To extensively rule out a mutual influence, the two temperature sensors 20b, 22b are separated at a partition 113. Both temperature sensors are accommodated in a common housing 112 of a stepped design.

Figure 9:
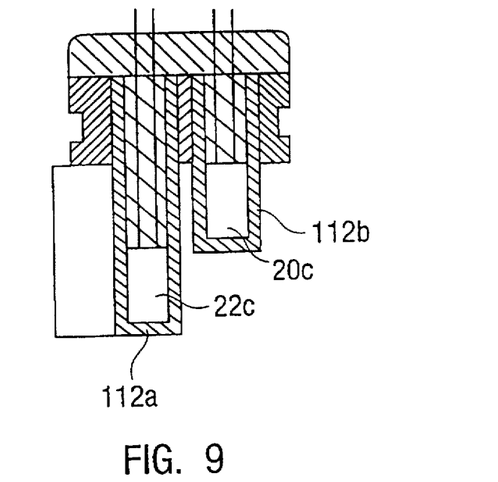
FIG. 9 is another variant of the sensor element shown schematically in FIG. 6.

FIG. 9 shows an embodiment similar to that in FIGS. 8a and 8b, but the water temperature sensor 20c is arranged in a separate housing 112b, and the overheating temperature sensor 22c is accommodated in a separate housing 112a in FIG. 9. The overheating temperature sensor 22c is longer than the water temperature sensor and can therefore be in contact with the gas jacket 7.

It is clear to the person skilled in the art that the above-described embodiments can be embodied each separately in a vehicle heater, but various meaningful combinations are possible as well. For example, the redundant circuit shown in FIG. 2 may be provided with the threshold value switch 38 in practically all the embodiments described, so that the switching off of the burner depends not only on the operation of the microprocessor 30, but also on the redundant branch of the circuit. This increases the safety. While the absolute value of the UFT signal sent by the overheating temperature sensor 22 is evaluated in the embodiment first described, and a gradient value is formed from the UFT signal in the embodiment described second, a combination of these variants is extremely meaningful, because overheating may also happen when the temperature at the overheating temperature sensor 22, i.e., at the gas jacket 7 in the vicinity of the end of the flame tube, is increasing only relatively slowly (low gradient value), but finally it does have an absolute value that characterizes a (highly imminent) overheating. A countermeasure must, of course, be taken immediately in this case as well.

Corresponding considerations also apply to the variant with the (controlling) water temperature sensor 20' arranged at the water outlet end of the heat exchanger. Regardless of how fast the temperature increases in the area of the water temperature sensor 20', switching off must be performed at an absolute temperature which characterizes a state of overheating. Consequently, if the overheating monitoring device has a temperature sensor instead of a switch, the switching off must take place when the signal sent by this temperature sensor is above the threshold value designated "Overheating" in the top part of FIG. 5.

The combination sensor element shown in FIGS. 7 through 9 can be used, in principle, in all the above-described vehicle heaters, but the variants according to FIGS. 8a, b and 9 are especially favorable because the overheating temperature sensor is in contact with the gas jacket, but the water temperature sensor is not.

PCT elements are used as temperature sensors in the above-described exemplary embodiments. However, it is also possible to use NTC (negative temperature coefficient) elements instead of these PTC elements. Instead of the above-mentioned emergency switch-off of the burner by blocking the fuel supply, it may be sufficient in certain cases to reduce only the burner output, without switching off the burner. This may be meaningful, e.g., when the heat carrier circulation is hindered by, e.g., a kinked tube or the like. However, in addition to the emergency switch-off or the reduction in the burner output, an alarm indication should preferably be generated in the case of a response of the overheating monitoring device, so that the user is informed by an optical or acoustic signal transmitter that the vehicle heater is not operating properly.

While specific embodiments of the invention have been shown and described in detail to illustrate the application of the principles of the invention, it will be understood that the invention may be embodied otherwise without departing from such principles.

We claim:

1. A vehicle heater comprising:

a burner;

a flame tube connected to said burner;

a heat exchanger means for flowing a heat carrier, said heat exchanger having a gas jacket spaced from said flame tube;

a heat carrier temperature sensor for measuring a heat carrier temperature of said heat carrier in said heat exchanger;

an overheating temperature sensor for measuring an overheating temperature of said heat exchanger adjacent an end of said flame tube;

control means for receiving said heat carrier temperature and controlling operation of said burner based on said heat carrier temperature, said control means also receiving said overheating temperature and forming one of a gradient signal from said overheating temperature and a difference signal between said overheating temperature and said heat carrier temperature, said control meat is blocking operation of said burner when said one of said gradient signal or said difference signal exceeds a threshold value.

2. A heater in accordance with claim 1, wherein:

said heat carrier temperature sensor is positioned adjacent an inlet of said heat exchanger.

3. A heater in accordance with claim 1, wherein:

said heat carrier temperature sensor is positioned in contact with said gas jacket.

4. A heater in accordance with claim 1, wherein:

said control means compares said heat carrier temperature and said overheating temperature and performs an emergency switch off of the heater when a difference between said heat carrier temperature and said overheating temperature exceeds a predetermined value.

5. A vehicle heater comprising:

a burner;

a flame tube connected to said burner;

a heat exchanger means for flowing a heat carrier, said heat exchanger having a gas jacket spaced from said flame tube;

a heat carrier temperature sensor for measuring a heat carrier temperature of said heat carrier in said heat exchanger;

an overheating temperature sensor for measuring an overheating temperature of said heat exchanger adjacent an end of said flame tube;

control means for receiving said heat carrier temperature and controlling operation of said burner based on said heat carrier temperature, said control means also receiving said overheating temperature and forming one of a gradient signal from said overheating temperature or a difference signal between said overheating temperature and said heat carrier temperature, said control means blocking operation of said burner when said one of said gradient signal or said difference signal exceeds a threshold value, said control means including a microprocessor for processing said heat carrier temperature and said overheating temperature, said control means also including a threshold switch connected to said overheating temperature sensor and said burner, said threshold switch being connected in parallel with said microprocessor and blocking operation of said burner when said overheating temperature exceeds a threshold value.

6. A heater in accordance with claim 5, wherein:

said microprocessor determines one of, if said heat carrier temperature or said overheating temperature are changing in a same direction, if there is a minimum difference between said heat carrier temperature and said overheating temperature, and if said heat carrier temperature is higher than said overheating temperature.

7. A heater in accordance with claim 5, wherein:

said control means generates a driving signal of pulses for timed operation of said burner, said driving signal being delivered to an input of a logic element, an output of said threshold switch being connected to another input of said logic element.

8. A heater in accordance with claim 1, wherein, said heat carrier temperature sensor and said overheating temperature sensor are one of PTC or NTC elements.

9. A vehicle heater comprising:

a burner;

a flame tube connected to said burner;

a heat exchanger means for flowing a heat carrier, said heat exchanger having a gas jacket spaced from said flame tube;

a heat carrier temperature sensor for measuring a heat carrier temperature of said heat carrier in said heat exchanger, said heat carrier temperature sensor being mounted adjacent an outlet of said heat exchanger;

an overheating temperature sensor for measuring an overheating temperature of said heat exchanger adjacent an end of said flame tube;

control means for receiving said heat carrier temperature and controlling operation of said burner based on said heat carrier temperature, said control means also receiving said overheating temperature and forming one of, a gradient signal from said heat carrier temperature, or a difference signal between said overheating temperature and said heat carrier temperature, said control means blocking operation of said burner when said one of said gradient signal or said difference signal exceeds a threshold value.

10. A heater in accordance with claim 9, wherein:

said heat carrier temperature sensor and said overheating temperature sensor are integrated into a common combination sensor element.

11. A heater in accordance with claim 10, wherein:

said heat exchanger includes an outer housing;

said combination sensor element includes a support section positioned in said outer housing, said heat carrier temperature sensor being connected to an end of said support section, said overheating temperature sensor also being connected to said end of said support section and being positioned adjacent said heat carrier temperature sensor.

12. A heater in accordance with claim 11, wherein:

said overheating temperature sensor extends from said support section further than said heat carrier temperature sensor extends from said support sensor.

13. A heater in accordance with claim 11, wherein:

said overheating temperature sensor and said heat carrier temperature sensor are positioned in a common housing.

14. A heater in accordance with claim 1, wherein: said control means performs one of, a reduction in output of said burner, an emergency switch-off, or indicating a warning when said threshold value is reached.

* * * * *